D. A. YORK.
RESILIENT TIRE.
APPLICATION FILED AUG. 2, 1910.
973,245.
Patented Oct. 18, 1910.
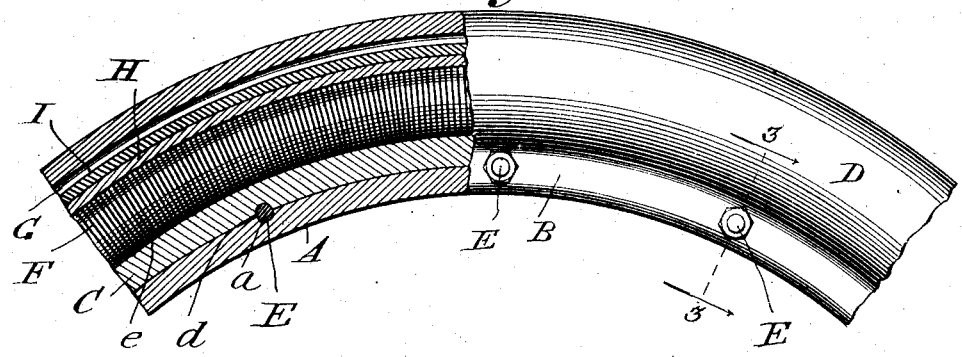
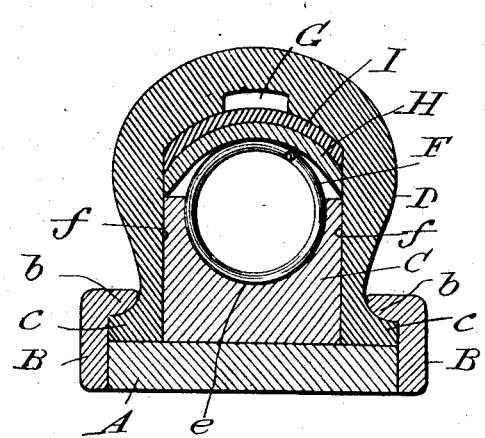
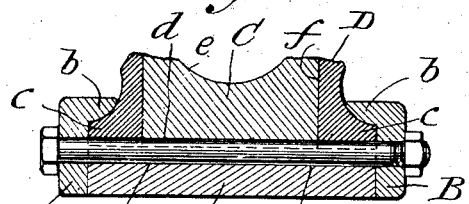

UNITED STATES PATENT OFFICE.

DAVID A. YORK, OF NORTHGROVE, INDIANA.

RESILIENT TIRE.

973,245.  Specification of Letters Patent.  Patented Oct. 18, 1910.

Application filed August 2, 1910.  Serial No. 575,118.

*To all whom it may concern:*

Be it known that I, DAVID A. YORK, citizen of the United States, residing at Northgrove, in the county of Miami and State of Indiana, have invented new and useful Improvements in Resilient Tires, of which the following is a specification.

My invention pertains to resilient tires such as are designed more particularly for use upon automobile wheels; and it has for its general object to provide a simple and durable tire including a coiled metallic spring, and possessed of great resiliency, and adapted to be expeditiously and easily repaired when occasion demands.

My invention will be best understood by reference to the following description when taken in connection with the accompanying illustration of one specific embodiment thereof, while its scope will be particularly claimed.

In the drawings: Figure 1 is a side elevation, partly in vertical section, of a portion of an automobile wheel equipped with my novel tire. Fig. 2 is a transverse section taken through the wheel felly and tire. Fig. 3 is a detail transverse section taken in the plane indicated by the line 3—3 of Fig. 1, and showing the arrangement of one of the connecting bolts relative to the felly and the spring-holder.

Similar letters designate corresponding parts in all views of the drawings, referring to which:

A is the felly of a wheel, which, in accordance with my invention, is provided at suitable intervals in its periphery with transverse grooves $a$.

B B are circular, cover-retaining plates, disposed at opposite sides of the felly A and having inturned flanges $b$ at their outer edges.

C is the circular spring-holder of my improved construction.

D is the cover of rubber or other suitable material, which is provided at its edges with outwardly directed flanges $c$, and E E are transverse bolts through the medium of which the side plates B are detachably connected with the felly A and the spring-holder C, and the said spring-holder C is effectually held against creeping around upon the felly A.

As will be observed by reference to Fig. 3, the side of the spring-holder C that is opposed to the felly A is provided at intervals with transverse grooves $d$, which grooves $d$ are registered with the grooves $a$ in felly A to receive the bolts E, whereby said bolts E are enabled to preclude the mentioned creeping of the spring-holder C, and in that way contribute to the strength and durability of the tire as a whole. The spring seat $e$ in the holder C describes more than half of a circle, as shown in Fig. 2, and hence is enabled to prevent outward movement or material lateral deflection of the continuous coiled spring F hereinafter described. It will also be observed that the side walls $f$ of the circular spring-holder C are disposed at right-angles to the inner side of the said holder, and that therefore the said side walls $f$ are calculated to support the sides of the cover D, and prevent the imposition of strain on the said cover when a lateral pressure or blow is imposed on the cover.

The spring F is a continuous coiled spring of metal, which is disposed in and held by the seat $e$ of the holder C and has its ends connected together in any suitable manner. By reason of the said spring F being disposed in the seat $e$ that describes more than half of a circle, the spring is securely retained without diminishing in appreciable degree the resiliency or cushioning capacity thereof, and from this it follows that the cover D is not required to hold the spring and is not subjected to any pressure by the spring, but on the other hand the office of the said cover is to exclude dust and dirt from the spring, and at the same time contribute to the resiliency or cushioning capacity of the tire as a whole. In the inner side of its tread portion the cover D is provided with a longitudinal chamber G which extends entirely around the spring F, and is best illustrated in Fig. 2.

With a view to effectually preventing wear or deterioration of the cover D by the spring F, I surround the spring with a circular layer H of fibrous material, and I further surround the said layer H with a layer I of raw hide. These layers extend between the opposite sides of the cover D and abut at their edges against said sides with the result that they are enabled to effectually prevent the infliction of any injury by the spring on the cover. It will also be noted that the rawhide layer I is arranged against and reinforces the tread portion of the cover D, and that the chamber G in said tread portion serves the two-fold purpose of rendering the tread portion light in weight and increasing the resiliency of the tire as a whole.

When it is necessary for any reason to gain access to the interior of the tire, the bolts E and the side plates B may be removed, and then the cover D can be readily taken off to expose the spring F and the parts adjacent thereto.

It will also be gathered from the foregoing that it is practical to construct both the felly A and the spring-holder C of wood or other material that is light in weight, though I would have it distinctly understood that the said felly and spring-holder may be constructed of any other material or materials without affecting my invention.

While I have shown and described one form of my invention, it is to be understood that I am not limited to the details or the form or relative arrangement of parts disclosed, but that modifications may be made therein without departing from the spirit thereof.

Having described my invention, what I claim and desire to secure by Letters-Patent, is:

In a resilient tire, the combination of a wheel felly having transverse grooves at intervals in its periphery, a circular holder, of less width than the felly, snugly surrounding the vertical-central portion of the felly and having straight sides extending from its inner side to its periphery and also having a seat in its periphery and further having transverse grooves in its inner side registered with those of the felly, cushioning means arranged in the seat of said holder, a cover having side portions arranged at opposite sides of and braced by the holder and also having edge portions bearing against the periphery of the felly, at opposite sides of the holder, cover-retaining plates arranged at opposite sides of the felly and having means for coöperating with the edge portions of the cover to confine said edge portions against the felly and the holder, and transverse connecting bolts extending through the said plates and occupying the registered grooves in the felly and holder.

In testimony whereof I have hereunto set my hand in presence of two subscribing witnesses.

DAVID A. YORK.

Witnesses:
T. E. TURPIN,
N. C. HEALY.